(12) United States Patent
Hiroi et al.

(10) Patent No.: US 10,156,250 B2
(45) Date of Patent: Dec. 18, 2018

(54) CASE NUT

(71) Applicant: AOYAMA SEISAKUSHO CO., LTD., Niwa-Gun (JP)

(72) Inventors: Yuichi Hiroi, Niwa-Gun (JP); Katsuhisa Katoh, Niwa-Gun (JP); Shigeki Matsunami, Niwa-Gun (JP); Yukinori Fujimoto, Niwa-Gun (JP)

(73) Assignee: Aoyama Seisakusho Co., Ltd., Niwa-Gun (JP)

( * ) Notice: Subject to any disclaimer, the term of this patent is extended or adjusted under 35 U.S.C. 154(b) by 0 days.

(21) Appl. No.: 15/825,482

(22) Filed: Nov. 29, 2017

(65) Prior Publication Data

US 2018/0112701 A1   Apr. 26, 2018

Related U.S. Application Data

(63) Continuation of application No. PCT/JP2016/065556, filed on May 26, 2016.

(30) Foreign Application Priority Data

Jul. 13, 2015   (JP) .................. 2015-139830

(51) Int. Cl.
  *F16B 39/24*   (2006.01)
  *F16B 37/04*   (2006.01)
  *F16B 37/06*   (2006.01)

(52) U.S. Cl.
  CPC .......... *F16B 37/044* (2013.01); *F16B 37/061* (2013.01)

(58) Field of Classification Search
  CPC .............................. F16B 37/046; F16B 37/061

USPC .................................................. 411/111, 172
See application file for complete search history.

(56) References Cited

U.S. PATENT DOCUMENTS

| | | | | |
|---|---|---|---|---|
| 3,508,592 A | * | 4/1970 | Rosan, Sr. | ............... F16B 37/14 411/108 |
| 4,762,451 A | * | 8/1988 | Collins | .................... B60R 11/00 411/177 |
| 5,836,613 A | * | 11/1998 | Saito | ..................... B60R 21/055 280/808 |

(Continued)

FOREIGN PATENT DOCUMENTS

| JP | S60-150314 U | 10/1985 |
|---|---|---|
| JP | S63-018612 U | 2/1988 |

(Continued)

OTHER PUBLICATIONS

International Search Report and Written Opinion (Application No. PCT/JP2016/065556) dated Jul. 5, 2016.

(Continued)

*Primary Examiner* — Gary W Estremsky
(74) *Attorney, Agent, or Firm* — Burr & Brown, PLLC (57) ABSTRACT

Provided is a case nut in which a nut that is held inside a case body so as to swing freely is not fixed as a result of electrodeposition coating treatment. The case nut is provided with a case body that is welded to a body, and a nut that is held inside the case body so as to float freely. The nut is provided with a metal nut body and a resin insulating member that is formed on the outside of the nut body and prevents contact of the upper surface, lower surface and outer surfaces of the nut body with the inner wall surfaces of the case body and with the body.

3 Claims, 7 Drawing Sheets

(56) References Cited

U.S. PATENT DOCUMENTS

| | | | | |
|---|---|---|---|---|
| 6,146,071 | A * | 11/2000 | Norkus | F16B 37/044 296/187.09 |
| 7,021,875 | B2 * | 4/2006 | Yake | F16B 33/06 411/111 |
| 7,255,521 | B2 * | 8/2007 | Yake | F16B 33/06 411/111 |
| 7,275,612 | B2 * | 10/2007 | Komura | B60R 16/04 180/68.5 |
| 7,441,996 | B2 * | 10/2008 | Odulio | B62D 24/02 411/111 |
| 9,080,592 | B2 * | 7/2015 | Oberndorfer | B21D 39/032 |
| 2004/0228700 | A1 | 11/2004 | Clinch et al. | |
| 2009/0245967 | A1 | 10/2009 | Curley, Jr. et al. | |
| 2012/0155987 | A1 | 6/2012 | Watanabe | |
| 2015/0004851 | A1 | 1/2015 | Marcon et al. | |

FOREIGN PATENT DOCUMENTS

| | | |
|---|---|---|
| JP | H01-063811 U | 4/1989 |
| JP | 2007-536470 A1 | 12/2007 |
| JP | 2012-126345 A1 | 7/2012 |
| JP | 2012-207760 A1 | 10/2012 |
| JP | 2015-503717 A1 | 2/2015 |
| WO | 2005/008079 A2 | 1/2005 |

OTHER PUBLICATIONS

European Search Report, EP Application No. 16824155.2, dated Jun. 8, 2018 (7 pages).

* cited by examiner

CASE NUT

BACKGROUND OF THE INVENTION

Field of the Invention

The present invention relates to a case nut provided with a case body that is welded to a body of a vehicle, and a nut that is held inside the case body so as to float freely.

Description of Related Art

In mounting an additional part to a body of a vehicle, a nut is provided at a body side in advance and then the additional part and the body are fixed to each other by inserting a bolt from an additional part side with the additional part brought contacted with the body and by fastening the bolt to the nut. However, fastening workability might be deteriorated due to axial deviation between the bolt and the nut, or variation in fitting might be generated. In order to solve the problem, a case nut is used as the nut provided at the body side (Patent Literature 1). The case nut includes a case body that is welded to a body, and a nut that is held inside the case body so as to float freely. In fixing the additional part to the body, the nut held floatable freely in the case body absorbs the axial deviation between the bolt and the nut, so that the fastening can be facilitated, and the variation in fitting is not generated.

Since high corrosion resistance is required for a body of a vehicle, the body is subjected to electrodeposition coating treatment as surface preparation. The electrodeposition coating treatment refers to coating treatment of soaking the body in an electrolytic solution and energizing the body to form a coating on a surface of the body. Therefore, when the body on which a conventional case nut is provided is subjected to the electrodeposition coating treatment, a nut made of metal that is held so as to float freely is energized by contact with inner wall surfaces of the case body and the body. As a result, electrodeposition coating material is deposited on the nut. Therefore, the nut is fixed firmly to the inner wall surfaces of the case body or the body, so that the nut does not float freely.

CITATIONS LIST

Patent Literature

Patent Literature 1: JP 1988-018612 U

SUMMARY OF INVENTION

Technical Problem

An object of the present invention is to solve the conventional problem described above and to provide a case nut in which a nut that is held inside a case body so as to swing freely is not fixed as a result of electrodeposition coating treatment.

Solutions to Problems

The present invention according to a first aspect solves the problem described above and provides a case nut provided with a case body that is welded to a body, and a nut that is held inside the case body so as to float freely, wherein the nut includes a nut body that is made of metal, and an insulating member that is made of resin and is formed on an outside of the nut body to prevent contact of an upper surface, a lower surface, and an outer surface of the nut body with an inner wall surface of the case body and with the body.

The present invention according to a second aspect provides the case nut according to the first aspect of the present invention, wherein the insulating member has a protrusion that is in contact with the inner wall surface of the case body and the body, and the protrusion is located at a side portion of the nut body.

The present invention according to a third aspect provides the case nut according to claim 2 the second aspect of the present invention, wherein the case body has a notch formed at a corner portion of the case body.

The invention according to claim 3 provides the case nut according to claim 2, wherein the case body has a notch formed at a corner portion of the case body.

Advantageous Effects of Invention

In the case nut according to the present invention, the nut provided with the nut body made of metal and the insulating member made of resin and formed on the outside of the nut body to prevent the contact of the upper surface, the lower surface, and the outer surface of the nut body with the inner wall surface of the case body and the body is held inside the case body so as to float freely. With this configuration, at electrodeposition coating treatment, the insulating member rather than the nut body is brought into contact with the inner wall surface of the case body and the body, so that the nut body made of metal can be insulated. Thus, at the electrodeposition coating treatment, the nut can be prevented from being fixed to the inner wall surface of the case body and the body.

Further, after the electrodeposition coating treatment, the body is subjected to high temperature drying treatment. Thus, as described in the present invention according to the second aspect, preferably, the protrusion coming into contact with the inner wall surface of the case body and the body is formed on the insulating member and is located at the side portion of the nut body. The protrusion minimizes a contact area of the insulating member with the inner wall surface of the case body and the body. It is therefore possible to avoid firm fixation of the nut, which is caused by the remaining electrolytic solution dried at high temperature. That is, after the high temperature drying treatment, the nut is easily separated from the inner wall surface of the case body and the body by addition of, for example, vibrations to be able to float freely inside the case body.

As described in the present invention according to the third aspect, preferably, the notch is formed at the corner portion of the case body. Thus, the electrolytic solution in the case body can be discharged to the outside and can be prevented from being retained.

BRIEF DESCRIPTION OF DRAWINGS

FIGS. 7(*a*), 7(*b*), and 7(*c*) respectively are a front view, a side view, and a cross-sectional view of the nut according to the second embodiment.

DETAILED DESCRIPTION OF THE INVENTION

Figure 3:
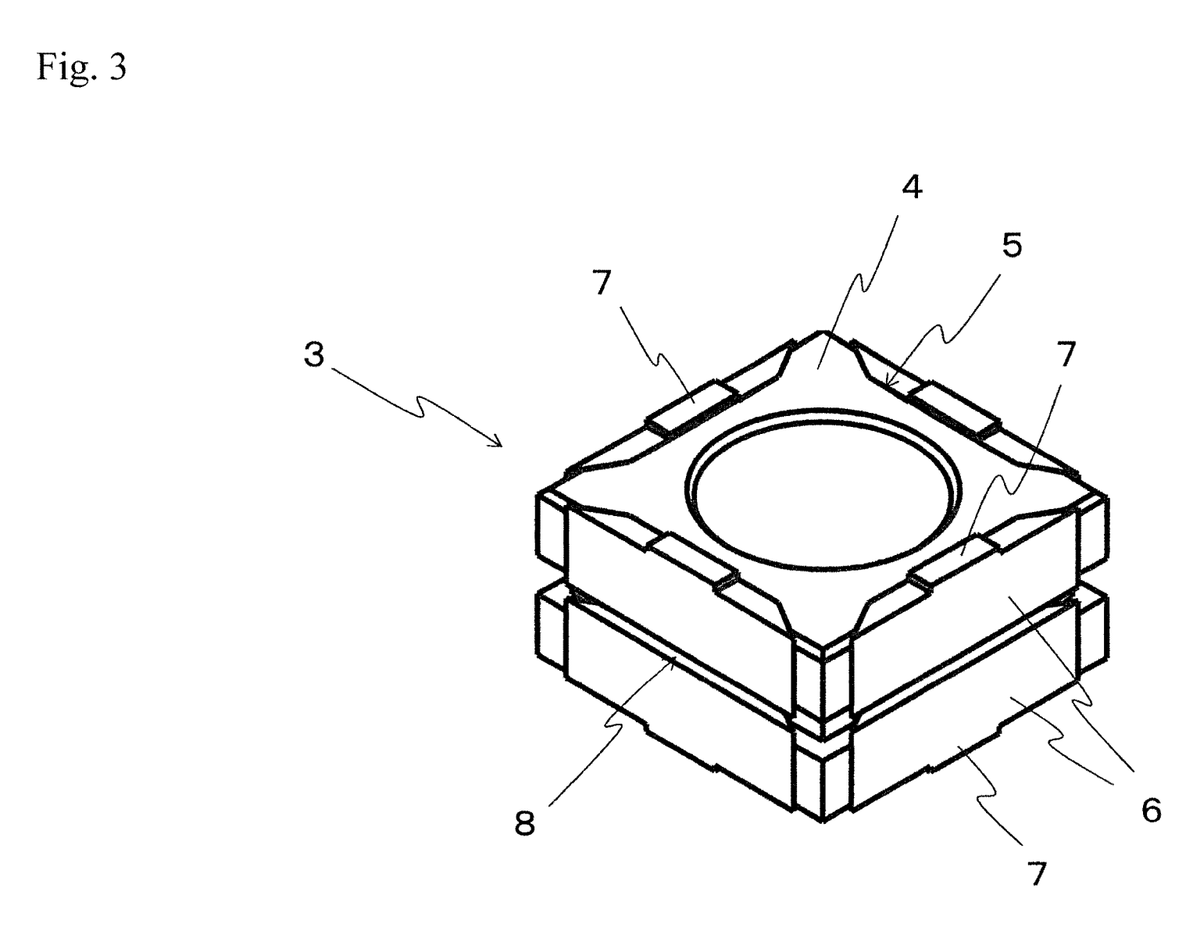
FIG. 3 is a perspective view of a nut according to the first embodiment.

A case nut of the present invention is constituted of a case body and a nut held inside the case body so as to float freely. In a first embodiment shown in FIGS. 1, 2(*a*), and 2(*b*), the case nut includes a case body 2 made of metal, formed in a substantially U-shape in a vertical cross section, and welded to a body 1 of a vehicle, and a nut 3 held inside the case body 2 so as to be floatable freely. Similar to a conventional case nut, the body 1 is subjected to electrodeposition coating treatment as surface preparation for enhancing the corrosion resistance of the body 1. As shown in FIG. 3, the nut 3 includes a nut body 4 made of metal, and insulating members 6 made of resin and formed on an upper surface, a lower surface, and outer surfaces of the nut body 4. The insulating members 6 are formed by insert molding in recesses 5 formed by denting the outer surfaces of the nut body 4 in an axial direction.

Figure 4:
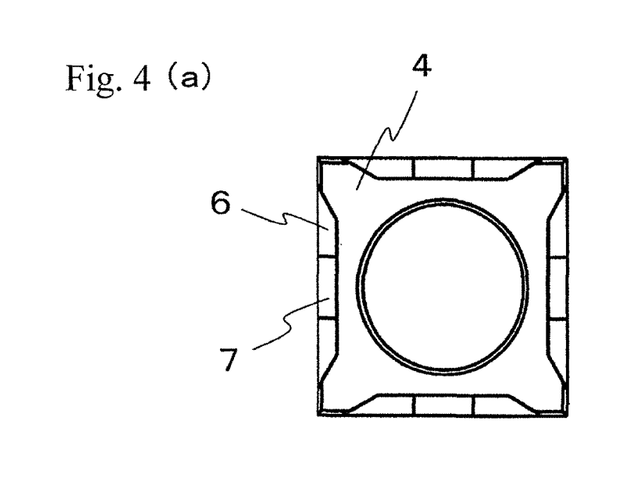
FIGS. 4(a), 4(b), and 4(c) respectively are a front view, a side view, and a cross-sectional view of the nut according to the first embodiment.

As shown in FIGS. 4(*a*)-4(*c*), the insulating members 6 are formed to slightly protrude outward relative to the upper surface, the lower surface, and the outer surfaces of the nut body 4. That is, the insulating members 6 prevent contact of the respective surfaces of the nut body 4 with inner wall surfaces of the case body 2 and the body 1, with the nut 3 held in the case body 2. Accordingly, at the electrodeposition coating treatment, the insulating members 6 rather than the nut body 4 are brought into contact with the inner wall surfaces of the case body 2 and the body 1, so that the nut body 4 made of metal can be insulated. Thus, even when the body 1 is soaked in an electrolytic solution in any orientation and is energized at the electrodeposition coating treatment, electrodeposition coating material is not deposited on the nut 3, so that the nut 3 is not fixed to the inner wall portions of the case body 2 and the body 1.

Further, protrusions 7 are formed on the insulating members 6 on the upper surface and lower surface of the nut body 4 so as to be in contact with the inner wall surfaces of the case body 2 and the body 1. Preferably, the protrusions 7 are located at side portions of the nut body 4. More preferably, the protrusions 7 are formed at substantially centers of the side portions of the nut body 4.

After the electrodeposition coating treatment, the body 1 is subjected to high temperature drying treatment. Accordingly, the protrusions 7 minimize a contact area of the insulating members 6 with the inner wall surfaces of the case body 2 and the body 1. It is therefore possible to avoid firm fixation of the nut 3, which is caused by the remaining electrolytic solution dried at high temperature.

In the present embodiment, the insulating members 6 are made of nylon 6 (registered trademark). This is because nylon 6 has the high melting point of 260° C. and withstands high temperature in the electrodeposition coating treatment. Further, the insulating members 6 may be made of material having high alkali resistance and being capable of withstanding the electrodeposition coating treatment at 180° C. (i.e., material whose melting point is preferably equal to or more than 240° C.). For example, the insulating members 6 may be made of polyphenylene sulfide or the like.

As shown in FIGS. 3, 4(*a*), 4(*b*), and 4(*c*), the insulating members 6 formed on the outer surfaces of the nut body 4 may be provided with grooves 8 formed by cutting out the insulating members 6 in a horizontal direction. This configuration enables to ensure a flow passage for the electrolytic solution at the electrodeposition coating treatment and to prevent the electrolytic solution from being retained.

Figure 1:
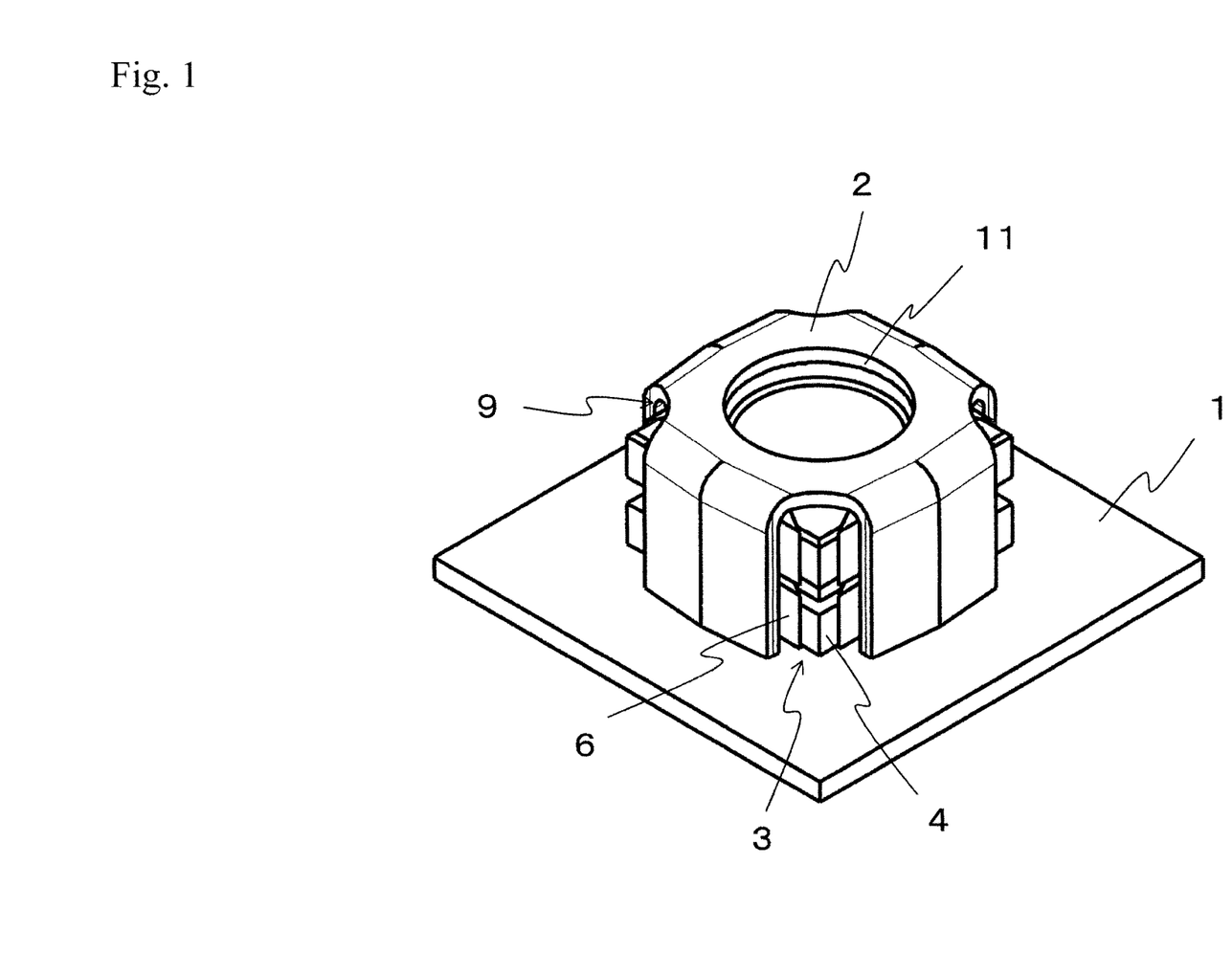
FIG. 1 is a perspective view of a first embodiment.
Figure 2:
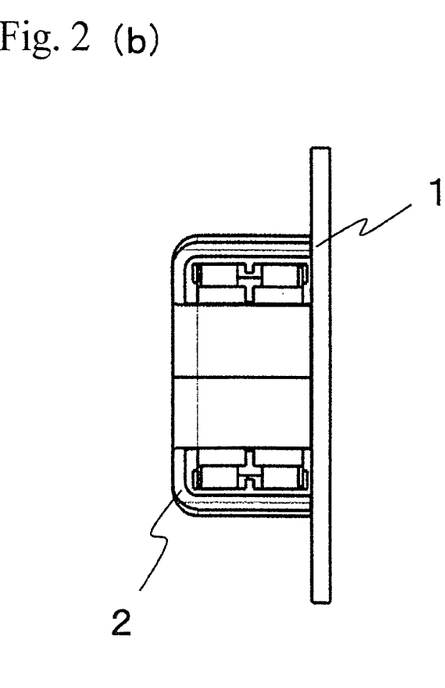
FIGS. 2(a) and 2(b) respectively are a front view and a side view of the first embodiment.

Further, as shown in FIG. 1, notches 9 are formed at corner portions of the case body 2. Thus, corner portions of the nut 3 are exposed from the notches, so that the electrolytic solution in the case body 2 can be discharged to the outside and can be prevented from being retained.

Figure 5:
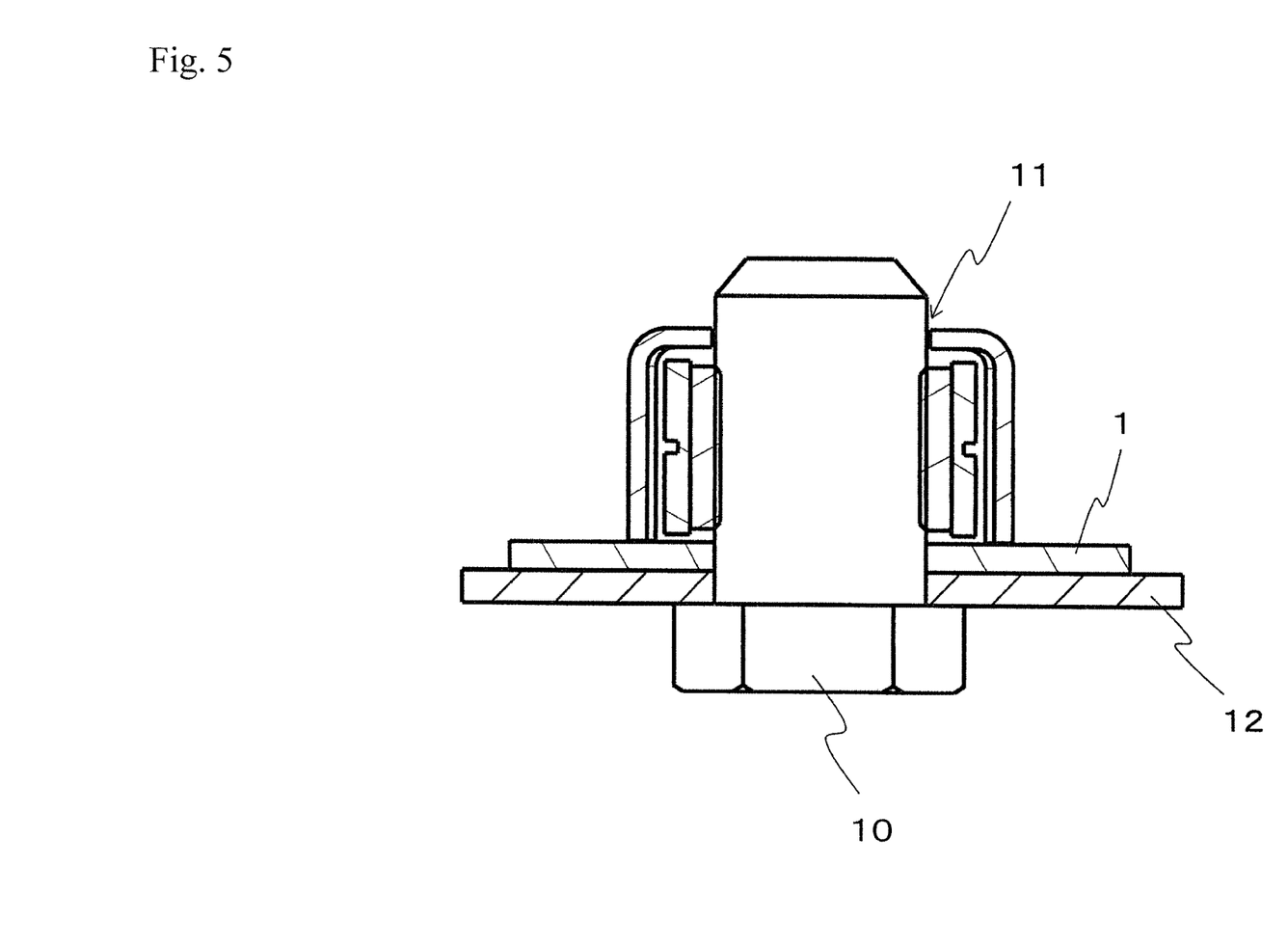
FIG. 5 is a cross-sectional view illustrating a mount state of an additional part.

As shown in FIGS. 1 and 5, a bolt hole 11 through which a bolt 10 passes is formed in the upper surface of the case body 2. A description will be given of a method of using the case nut, configured as described above, according to the present invention. After the electrodeposition coating treatment in the state shown in FIG. 1, the case nut is subjected to the high temperature drying treatment. At the electrodeposition coating treatment, the nut body 4 is insulated by the insulating members 6. Moreover, the protrusions 7 can prevent the firm fixation of the nut 3 due to the high temperature drying. After the two kinds of treatment, therefore, the nut 3 is easily separated from the inner wall surfaces of the case body 2 and the body 1 by, for example, vibrations to be able to float freely inside the case body 2. As shown in FIG. 5, thus, the bolt 10 is screwed into the nut 3 with an additional part 12 to be mounted to the body 1 brought into contact with the body 1, so that the nut 3 floatable freely inside the case body 2 absorbs axial deviation between the nut 3 and the bolt 10, and the additional part 12 can be easily fixed to the body 1.

Second Embodiment

Figure 6:
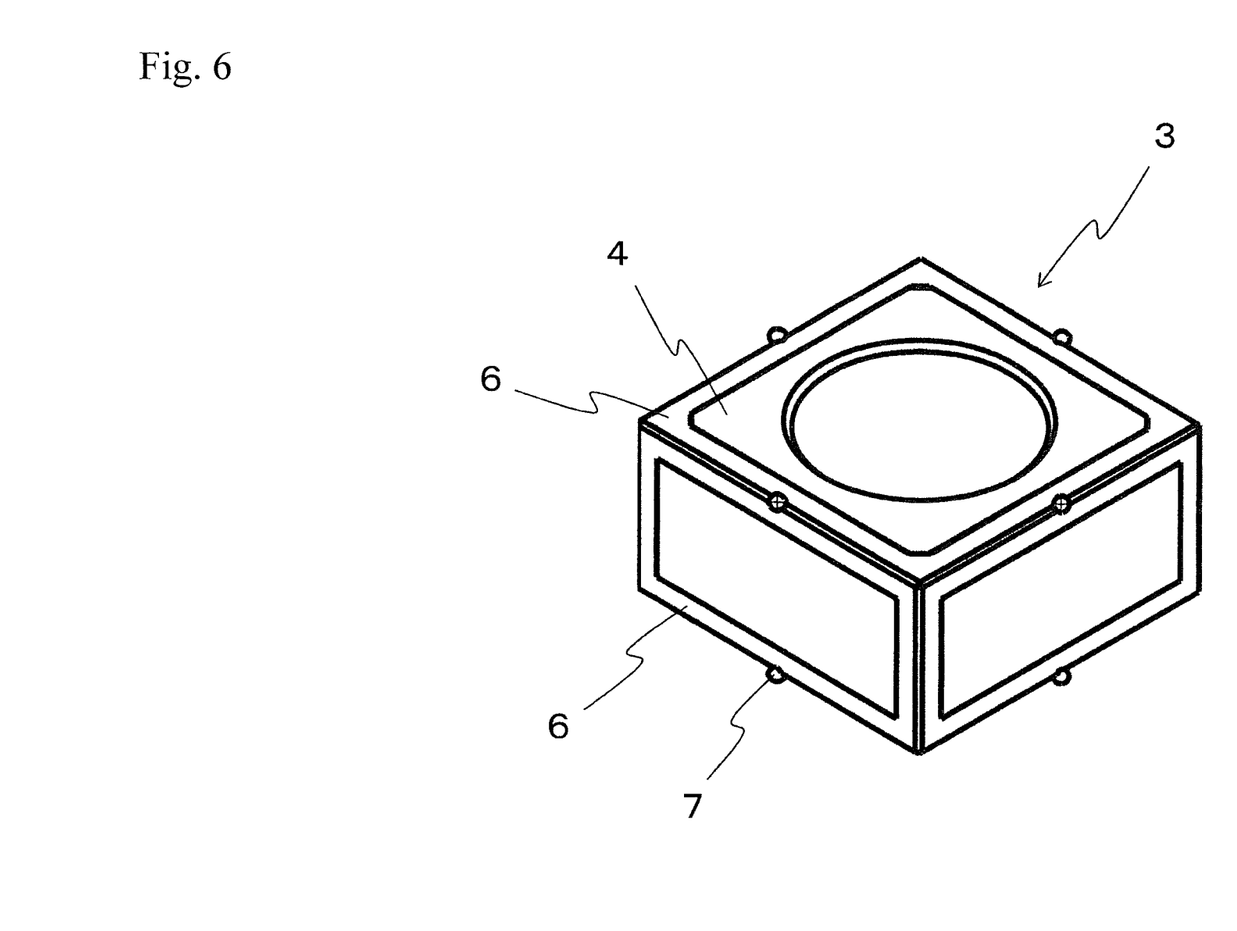
FIG. 6 is a perspective view of a nut according to a second embodiment.
Figure 7A:
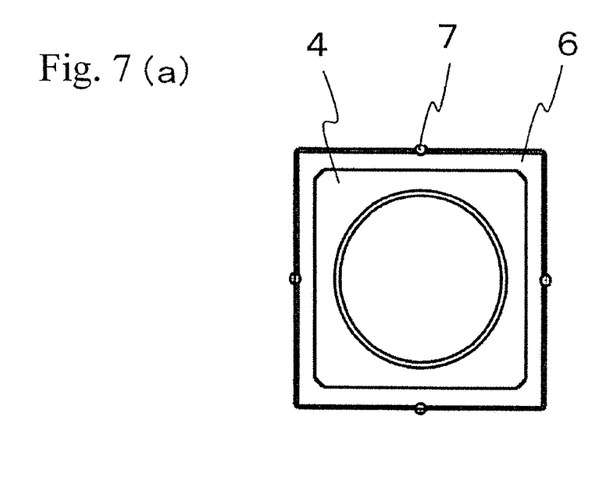
Figure 7B:
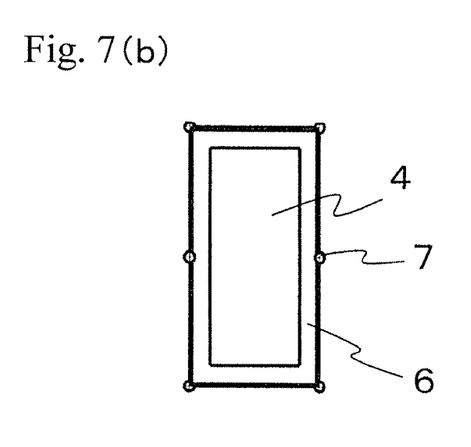
Figure 7C:
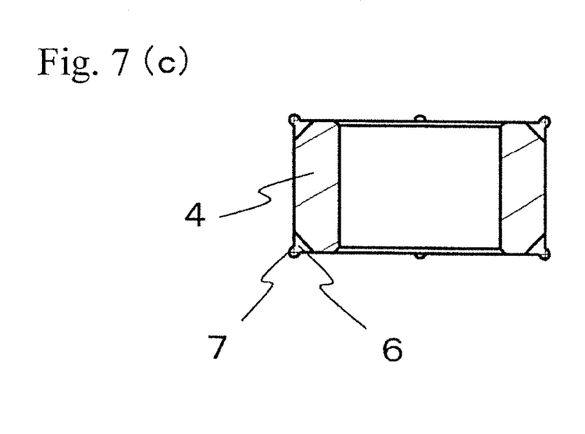

FIGS. 6, 7(*a*), 7(*b*), and 7(*c*) illustrate a second embodiment. In this embodiment, an insulating member 6 made of resin is formed by insert molding on an outer edge of a nut body 4, and protrusions 7 formed in a substantially spherical shape are formed at substantially centers of side portions of the nut body 4 so as to be in contact with inner wall surfaces of a case body 2 and a body 1. The insulating member 6 and the protrusions 7 also enable insulation of the nut body 4, made of metal, at the electrodeposition coating treatment and prevent fixation of the nut body 4 to the inner wall portions of the case body 2 and the body 1. Further, since the protrusions 7 are formed to be smaller than the protrusions 7 in the first embodiment, a contact area of the insulating member 6 with the inner wall surfaces of the case body 2 and the body 1 becomes smaller, so that the fixation due to the high temperature treatment can be further decreased.

REFERENCE SIGNS LIST

1: body
2: case body
3: nut
4: nut body
5: recess
6: insulating member
7: protrusion
8: groove
9: notch
10: bolt
11: bolt hole
12: additional part

The invention claimed is:

1. A case nut comprising:

a case body that is welded to a body; and a nut that is held inside the case body so as to float freely, wherein the nut includes a nut body that is made of metal, which has a female thread part, and an insulating member that is made of resin and is formed on an outside of the nut body to prevent contact of an upper surface, a lower surface, and an outer surface of the nut body with an inner wall surface of the case body and with the body, wherein the female thread part is not covered with the insulating member.

2. The case nut according to claim 1, wherein the insulating member has a protrusion that is in contact with the inner wall surface of the case body and the body, and the protrusion is located at a side portion of the nut body.

3. The case nut according to claim 2, wherein the case body has a notch formed at a corner portion of the case body.

* * * * *